United States Patent
Asahi et al.

(10) Patent No.: US 9,073,214 B2
(45) Date of Patent: Jul. 7, 2015

(54) ROBOT SYSTEM

(71) Applicant: KABUSHIKI KAISHA YASKAWA DENKI, Kitakyushu-shi (JP)

(72) Inventors: Takefumi Asahi, Kitakyushu (JP); Yukiko Sawada, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/218,987

(22) Filed: Mar. 19, 2014

(65) Prior Publication Data
US 2014/0288707 A1 Sep. 25, 2014

(30) Foreign Application Priority Data
Mar. 19, 2013 (JP) ................. 2013-056703

(51) Int. Cl.
G05B 19/04 (2006.01)
G05B 19/18 (2006.01)
B25J 9/16 (2006.01)
B25J 19/06 (2006.01)
F16P 3/14 (2006.01)

(52) U.S. Cl.
CPC ............... *B25J 9/1674* (2013.01); *B25J 19/06* (2013.01); *F16P 3/144* (2013.01); *F16P 3/147* (2013.01)

(58) Field of Classification Search
CPC .......... B25J 9/1674; B25J 9/06; F16P 3/144; F16P 3/147
USPC ................................. 700/245–264
See application file for complete search history.

(56) References Cited

U.S. PATENT DOCUMENTS

| | | | |
|---|---|---|---|
| 2006/0049939 A1* | 3/2006 | Haberer et al. | 340/541 |
| 2006/0184274 A1* | 8/2006 | Sakai et al. | 700/245 |
| 2008/0021597 A1* | 1/2008 | Merte et al. | 700/255 |
| 2010/0072184 A1* | 3/2010 | Osicki | 219/125.1 |
| 2010/0191372 A1* | 7/2010 | Nihei et al. | 700/245 |
| 2012/0041593 A1* | 2/2012 | Ichinose et al. | 700/258 |
| 2012/0290132 A1* | 11/2012 | Kokubo et al. | 700/255 |
| 2013/0103198 A1 | 4/2013 | Nakamoto et al. | |
| 2014/0288706 A1* | 9/2014 | Asahi et al. | 700/250 |
| 2014/0288711 A1* | 9/2014 | Sawada et al. | 700/259 |

FOREIGN PATENT DOCUMENTS

| | | |
|---|---|---|
| JP | 2011-253377 | 12/2011 |
| JP | 2012-000742 | 1/2012 |
| JP | 2012-027732 | 2/2012 |

OTHER PUBLICATIONS

Japanese Office Action for corresponding JP Application No. 2013-056703, Sep. 2, 2014.

* cited by examiner

*Primary Examiner* — Jason Holloway
*Assistant Examiner* — Rachid Bendidi
(74) *Attorney, Agent, or Firm* — Mori & Ward, LLP

(57) ABSTRACT

A robot system is provided, which includes a robot, a controller for controlling an operation of the robot, and a sensor for detecting a person entering into a delivery area where the robot and the person deliver an object therebetween. When the sensor detects the person entering into the delivery area, the controller sets to the delivery area a first restricted area where the operation of the robot is restricted, and controls the robot based on the first restricted area.

6 Claims, 3 Drawing Sheets

ROBOT SYSTEM

CROSS-REFERENCE TO RELATED APPLICATION(S)

The application claims priority under 35 U.S.C. §119 to Japanese Patent Application No. 2013-056703, which was filed on Mar. 19, 2013, the entire disclosure of which is hereby incorporated by reference.

TECHNICAL FIELD

The present disclosure relates to a robot system.

BACKGROUND OF THE INVENTION

In recent years, there have been increasing demands for automating human tasks by robots. In a robot system provided with a robot, an object may be delivered between the robot and a person. When delivering the object, it is necessary to secure safety and, thus, various devices for sustaining the safety have been conventionally proposed. For example, JP2012-027732A discloses an article feeding device, a service providing system, and a robot, which are capable of delivering an article more safely between a robot and a person.

SUMMARY OF THE INVENTION

According to one aspect of the present disclosure, a robot system is provided, which includes a robot, a controller for controlling an operation of the robot, and a sensor for detecting a person entering into a delivery area where the robot and the person deliver an object therebetween. When the sensor detects the person entering into the delivery area, the controller sets to the delivery area a first restricted area where the operation of the robot is restricted, and controls the robot based on the first restricted area.

According to another aspect of the present disclosure, a method of manufacturing a workpiece using the robot system is provided.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
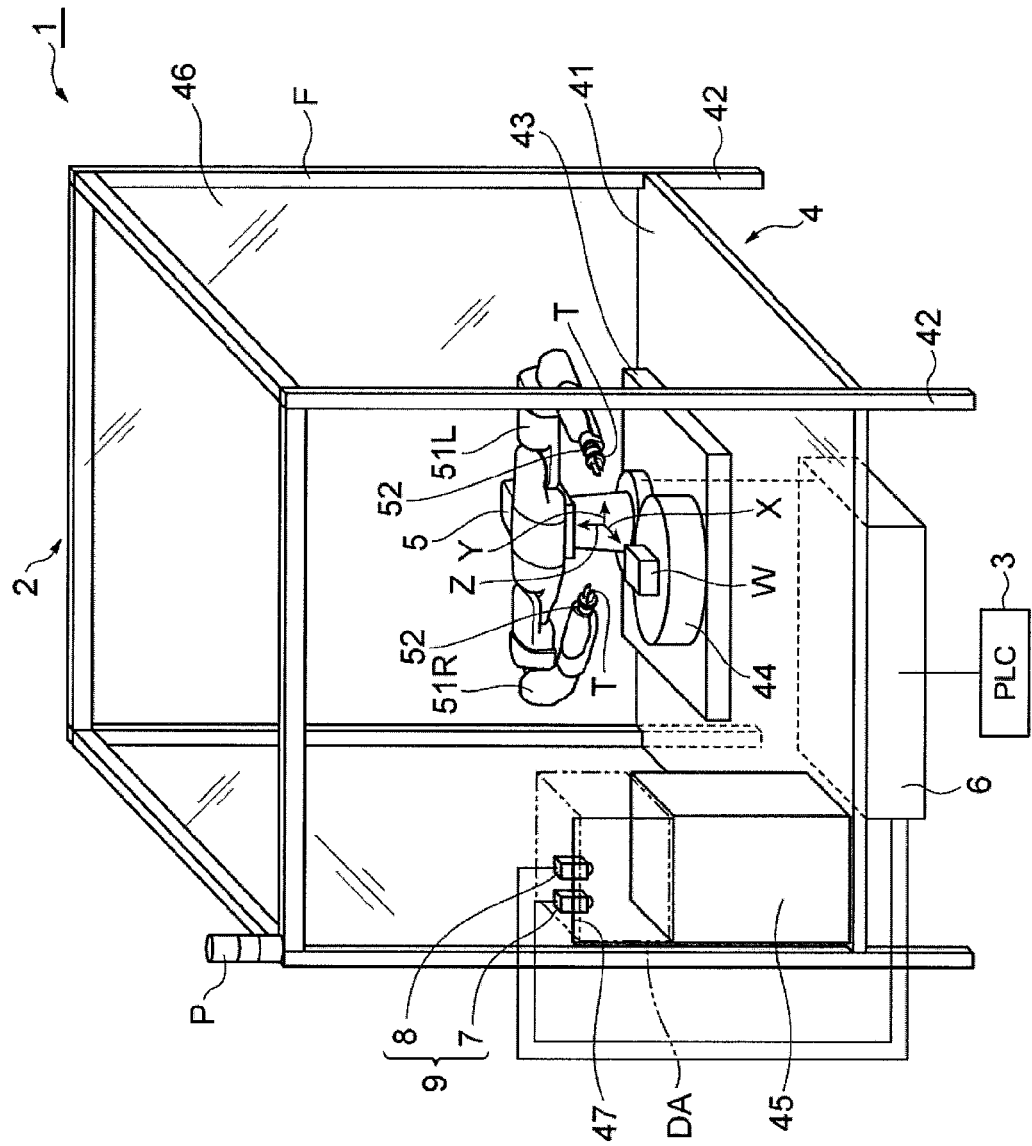
FIG. 1 is a schematic diagram illustrating one embodiment of a robot system according to the present disclosure.

Hereinafter, one embodiment is described in detail, referring to the accompanying drawings. In this embodiment, like reference numerals are given to elements having similar or same function and, thus, redundant description thereof will be omitted.

As illustrated in FIG. 1, a robot system 1 includes a robot cell 2 and a PLC (Programmable Logic Controller) 3 (controller). The robot cell 2 has a table part 4, a two-arm robot 5, a robot controller 6 (controller), and a sensor 9 (a first sensor 7 and a second sensor 8). By arranging a plurality of such robot cells 2, it is possible to construct a production line.

The table part 4 supports the two-arm robot 5 on an upper surface thereof. The table part 4 has a rectangular-plate-shaped supporting plate 41 and four legs 42 attached to a lower surface of the supporting plate 41. A rectangular-plate-shaped pedestal 43, which is smaller than the supporting plate 41, is provided on the supporting plate 41, and the two-arm robot 5 is placed on the pedestal 43. A short-cylinder-shaped working table 44, which is used by the two-arm robot 5 when the two-arm robot 5 operates, is provided on the pedestal 43 at a location apart from the two-arm robot 5.

A box-shaped delivery part 45 is provided on the supporting plate 41 at a location apart from the pedestal 43 (in FIG. 1, a corner location of the supporting plate 41). After a workpiece W is placed on the delivery part 45 by an operator, the two-arm robot 5 receives the workpiece W and then performs a predetermined task. Further, after the task, the two-arm robot 5 places the workpiece W on the delivery part 45, and the operator then retrieves the workpiece W. Thus, a delivery of the workpiece W is performed between the two-arm robot 5 and the operator. Note that, on the delivery part 45, for example, a tool T which is used by the two-arm robot 5 for the task, as or in addition to the workpiece W, may be delivered. Here, the term "object" delivered over the delivery part 45 may be any physical object, other than the workpiece W and the tool T.

A space above the supporting-plate 41 is surrounded by a cover 46 and, thus, the cover 46 covers the two-arm robot 5, the pedestal 43, the working table 44, and the delivery part 45 from sides and top. The cover 46 is comprised of four side plates extending upwardly from each of the four sides of the supporting plate 41, a top plate provided to upper parts of the side plates, and a frame F which supports the side plates and the top plate. The frame F has four vertical columns extending upwardly from respective four corners of the supporting plate 41, and four lateral columns, each coupling top ends of a pair of adjacent vertical columns. The side plates and the top plate of the cover 46 are made of a transparent material (for example, polycarbonate) so that everything inside the cover is visible from outside, for example. Note that an indication lamp P which indicates an operating state of the robot cell 2 is attached to the frame F.

A delivery opening 47 through which the operator is possible to insert his/her hand into the cover 46 is formed in a part of one of the side plates of the cover 46 corresponding to the delivery part 45. An area above the delivery part 45 which is an area adjacent to the delivery opening 47 (an area horizontally inward from the delivery opening 47) is a delivery area DA through which the two-arm robot 5 and the operator deliver the object (for example, the workpiece W and/or the tool T).

The two-arm robot 5 has a left arm 51L and a right arm 51R. The left arm 51L and the right arm 51R can work jointly, or, alternatively, can work independently from each other. That is, each of the left arm 51L and the right arm 51R can function as an independent robot. Each of the left arm 51L and the right arm 51R has an articulated structure, and includes a joint part 52 at a tip end part thereof. Each of the left arm 51L and the right arm 51R can operate in six degrees of freedom by a plurality of actuators built in the two-arm robot 5. Thus, the joint parts 52 can be moved to various locations and oriented into various postures. The tool T is attached to one or both of the joint parts 52. Note that the degrees of freedom of the left arm 51L and the right arm 51R is not limited to the six degrees of freedom described above, and may be five or less degrees of freedom, or may be seven or more degrees of freedom.

The robot controller 6 controls the operation of the two-arm robot 5. The robot controller 6 is a computer having, for example, a processor, a memory, and an input/output unit. The information outputted from and inputted into the robot controller 6 includes, for example, information on an area which defines operations of the left arm 51L and the right arm 51R (area information), a program (job) which defines a series of operations of the left arm 51L and the right arm 51R.

In this embodiment, the area information of the left arm 51L and the right arm 51R is defined as a three-dimensional area, and the area information includes a robot operation area, a cooperative operation area, and a keep-out area. The left arm 51L and the right arm 51R can enter into the robot operation area. The left arm 51L, the right arm 51R, or the operator, which or who is authorized to enter into the cooperative operation area, can enter into the cooperative operation area. The cooperative operation area is an area above the delivery part 45, for example. In the keep-out area, entering of the left arm 51L and the right arm 51R is forbidden. The keep-out area includes, for example, areas where peripheral objects, such as the supporting plate 41, the pedestal 43, the working table 44, the delivery part 45, and the cover 46, exist (or occupy), as well as areas outside the cover 46.

The robot controller 6 is disposed, for example, beneath the supporting plate 41. The two-arm robot 5 is connected with the robot controller 6 through wiring. Note that the two-arm robot 5 may be wirelessly connected with the robot controller 6, or the robot controller 6 may be built in the two-arm robot 5.

The first sensor 7 detects both entering of the operator into the delivery area DA and entering of the object into the delivery area DA. The first sensor 7 is a photoelectric sensor, for example. The first sensor 7 is fixed to an upper edge part of the delivery opening 47 so that the sensor 7 is orientated downwardly, where the sensor 7 emits light toward the delivery part 45 and receives reflected light.

The second sensor 8 detects only entering of the operator into the delivery area DA. The second sensor 8 is a tag sensor, for example. The tag sensor detects a tag 100 (refer to FIG. 2) which is worn by an operator by way of, for example, light or electromagnetic wave. The operator wears the tag 100 on his/her wrist with a band, for example. The second sensor 8 is fixed to the upper edge part of the delivery opening 47 so that the sensor 8 is located next to the first sensor 7 and is oriented downwardly.

When the object enters into the delivery area DA (when the object is placed on the delivery part 45), only the first sensor 7 among the first sensor 7 and the second sensor 8 responds. On the other hand, when the operator's hand enters into the delivery area DA, both the first sensor 7 and the second sensor 8 respond. That is, the first sensor 7 and the second sensor 8 together function as a single sensor 9 which can distinguish entering of the operator into the delivery area DA from entering of the object into the delivery area DA.

Each of the first sensor 7 and the second sensor 8 is connected with the robot controller 6 by wiring, and respective detection signals from the first sensor 7 and the second sensor 8 are sent to the PLC 3 via the robot controller 6. Note that each of the first sensor 7 and the second sensor 8 may be wirelessly connected with the robot controller 6.

When a plurality of robot cells 2 constitute a production line, the PLC 3 is shared by the plurality of robot cells 2, and controls the plurality of robot cells 2 as their host controller. The PLC 3 is a computer having a processor, a memory, and an input/output unit, for example. The PLC 3 is connected with the robot controller 6 by wiring or wirelessly.

Figure 2:
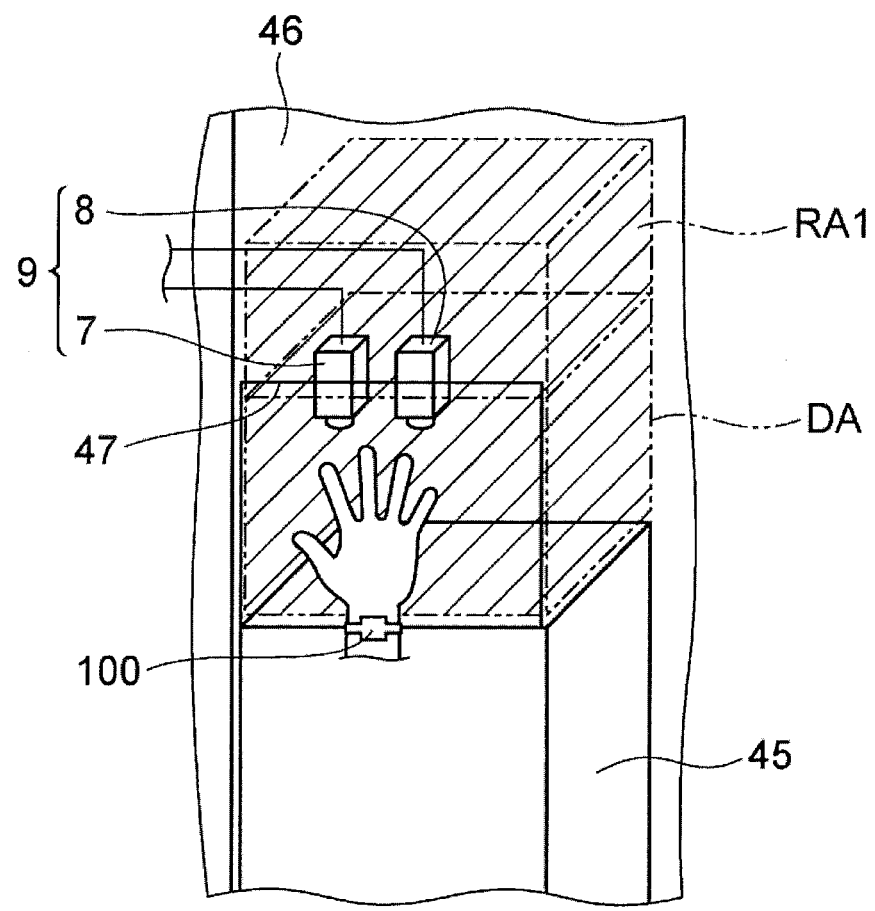
FIG. 2 is an enlarged view of a substantial part illustrating a first restricted area when a person enters into a delivery area.

As illustrated in FIG. 2, when it is detected that the operator (person) enters into the delivery area DA by the sensor 9 (when the detection signals are sent from both the first sensor 7 and the second sensor 8), the PLC 3 sets a first restricted area RA1 where the operations of the left arm 51L and the right arm 51R of the two-arm robot 5 are restricted within the delivery area DA (the area illustrated with hatching in FIG. 2). Here, the first restricted area RA1 is a three-dimensional area containing the delivery area DA, and it is a larger area than the delivery area DA. Here, specifically, the first restricted area RA1 also includes an area above the delivery area DA. Note that the first restricted area RA1 may include side areas next to the delivery area DA. Note that the first restricted area RA1 may have the same size as the delivery area DA, or may have a smaller size than the delivery area DA.

The PLC 3 instructs the robot controller 6 so that the operations of the left arm 51L and the right arm 51R within the first restricted area RA1 are restricted. The robot controller 6 which received the instruction restricts the operations of the left arm 51L and the right arm 51R. Specifically, entering of the left arm 51L and the right arm 51R is forbidden within the first restricted area RA1. Alternatively, within the first restricted area RA1, entering of the left arm 51L and the right arm 51R may not be forbidden, but operating speeds of the left arm 51L and the right arm 51R may be restricted to below a predetermined threshold.

Alternatively, forces (torques) applied to the left arm 51L and the right arm 51R may be restricted to below a predetermined threshold. If the forces applied to the left arm 51L and the right arm 51R are restricted, the weight of the object to be carried by the left arm 51L and the right arm 51R may be restricted to below a predetermined threshold.

Alternatively, types of the tool T which can be held by the left arm 51L and the right arm 51R may be restricted. If the types of tool T are restricted, entering of the left arm 51L and the right arm 51R holding, for example, sharp tools, into the first restricted area RA1 may be forbidden. Alternatively, two or more of the plurality of restrictions, such as the restriction of the operating speed, the restriction of the force, and the restriction of the types of holdable tool T may be carried out simultaneously.

Figure 3:
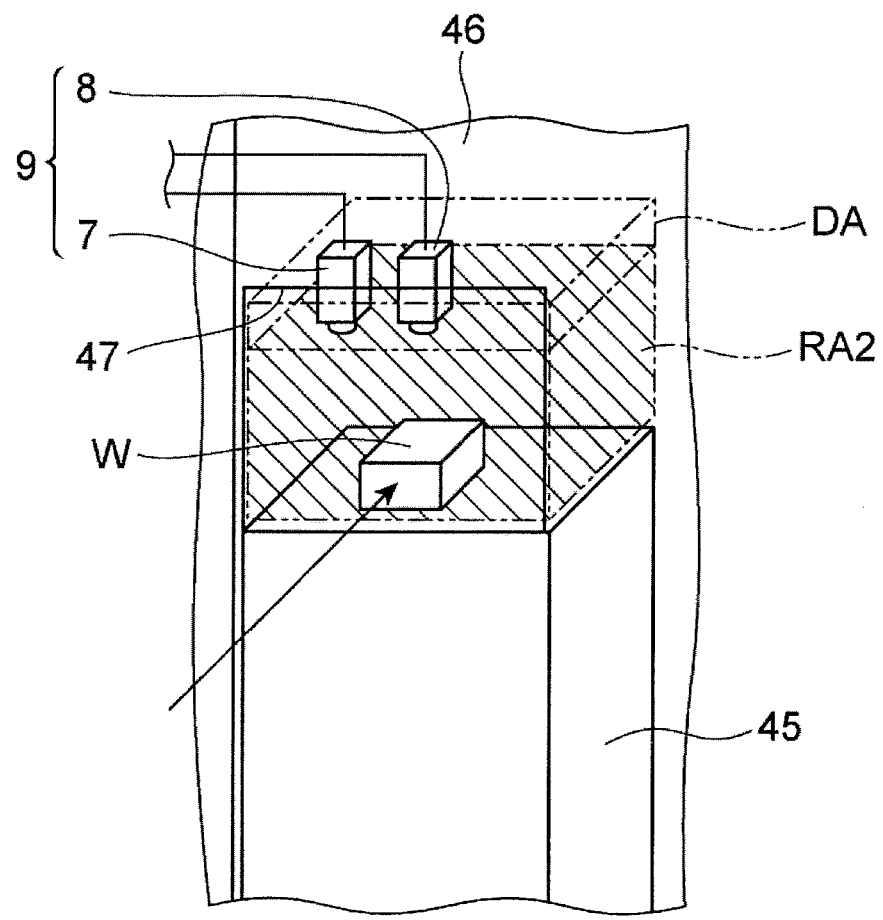
FIG. 3 is an enlarged view of a substantial part illustrating a second restricted area when an object enters into the delivery area.

As illustrated in FIG. 3, when it is detected by the sensor 9 that the object (for example, the workpiece W) enters into the delivery area DA (when the detection signal is sent only from the first sensor 7), the PLC 3 sets within the delivery area DA a second restricted area RA2 where the operations of the left arm 51L and the right arm 51R of the two-arm robot 5 are restricted (a three-dimensional area illustrated with hatching in FIG. 3). Here, the second restricted area RA2 is smaller than the first restricted area RA1, and is smaller than the delivery area DA. Specifically, an upper area of the delivery area DA is not included in the second restricted area RA2. Note that the second restricted area RA2 may be the same size as the first restricted area RA1. Alternatively, the second restricted area RA2 may be the same size as the delivery area DA, or may be larger than the delivery area DA.

The PLC 3 instructs the robot controller 6 so that operations of the left arm 51L and the right arm 51R within the second restricted area RA2 are restricted. The robot controller 6 which received the instruction restricts the operations of the left arm 51L and the right arm 51R. Within the second restricted area RA2, although similar restrictions to the first restricted area RA1 described above are carried out, the restrictions are loosened with respect to the first restricted area RA1 (less restriction is set). For example, when restricting the operating speed and the force, the threshold of the second restricted area RA2 is set greater than the threshold of the first restricted area RA1. Further, if restricting the types of the holdable tool T, more hazardous tools can be held within the second restricted area RA2 than the first restricted area RA1. The hazardous tools include the sharp tools as described above.

In the robot system 1 of the above embodiment, when the operator enters into the delivery area DA, since the first restricted area RA1 where the operations of the left arm 51L and the right arm 51R are restricted is set within the delivery area DA, interferences of the left arm 51L and the right arm 51R with the operator can be prevented and, thus, the safety can be sustained. On the other hand, when the operator does not enter into the delivery area DA, since the operations of the left arm 51L and the right arm 51R are not restricted within the delivery area DA, the operating efficiency can be improved. This is because, for example, even if the operator enters into the delivery area DA, the operation of the two-arm robot 5 does not need to be suspended.

Within the first restricted area RA1, the PLC 3 carries out at least one of restrictions, such as prohibition of entering of the left arm 51L and the right arm 51R, restriction of the speeds of the left arm 51L and the right arm 51R, restriction of the forces of the left arm 51L and the right arm 51R, and restriction of the types of the holdable tool T of the left arm 51L and the right arm 51R. Therefore, the safety can be sustained.

The sensor 9 can distinguish the entering of the operator into the delivery area DA from the entering of the object into the delivery area DA. Therefore, when the object enters into the delivery area DA, the operations of the left arm 51L and the right arm 51R will not be restricted unnecessarily.

When the sensor 9 detects the object entering into the delivery area DA, the PLC 3 sets the second restricted area RA2 where the operations of the left arm 51L and the right arm 51R are restricted, and controls the left arm 51L and the right arm 51R based on the second restricted area RA2. Therefore, the interference of the left arm 51L and the right arm 51R with the object can be prevented and, thus, the safety can be sustained. In addition, when the object enters into the delivery area DA, the operations of the left arm 51L and the right arm 51R are not restricted unnecessarily by setting the second restricted area RA2 which is different from the first restricted area RA1.

The second restricted area RA2 is smaller than the first restricted area RA1. Therefore, the operations of the left arm 51L and the right arm 51R are not restricted unnecessarily.

In the first and second restricted areas RA1 and RA2, the PLC 3 carries out at least one of the restrictions, such as the prohibition of entering of the left arm 51L and the right arm 51R, the restriction of the speeds of the left arm 51L and the right arm 51R, the restriction of the forces of the left arm 51L and the right arm 51R, and the restriction of the types of holdable tool of the left arm 51L and the right arm 51R. Within the second restricted area RA2, the restriction of the operations of the left arm 51L and the right arm 51R is less than the first restricted area RA1. Therefore, the safety can be sustained, while the operations of the left arm 51L and the right arm 51R are not restricted unnecessarily.

The sensor 9 includes the first sensor 7 that can detect the entering of the person and the object into the delivery area DA, and the second sensor 8 that can detect entering of the person into the delivery area DA. By such a configuration, the entering of the operator (person) into the delivery area DA can be distinguished from the entering of the object into the delivery area DA.

The robot system 1 includes the table part 4 for supporting the two-arm robot 5, and is constituted as a robot cell 2. When a plurality of the robot cells 2 are arrayed to constitute a production line, since both the sustenance of the safety and the improvement of the operating efficiency can be achieved in each of the robot cells 2, the sustenance of the safety and the improvement of the operating efficiency can also be achieved in the entire production line.

Similar effects can also be acquired in a method of manufacturing the workpiece using the robot systems 1. The workpiece includes, for example, a part such as a bolt, and an assembly such as an automobile part and an automobile.

As described above, although one embodiment is described, the present disclosure is not necessarily limited to the embodiment described above, and various modifications, additions, and changes can be made without departing from the scope of the present disclosure.

For example, in the above embodiment, although the controller for performing the setting of the first restricted area and the second restricted area is the PLC 3, it may be the robot controller 6. In the above embodiment, although the single sensor 9 is provided, a plurality of sensors may be provided to give redundancy to the system.

In the above embodiment, although the second sensor 8 is the tag sensor, it may be a temperature sensor. In this case, when the detection signal is sent from the first sensor 7 that is the photoelectric sensor, and a temperature detected by the second sensor 8 that is the temperature sensor is a body temperature of the person, it can be determined that the person enters into the delivery area DA. On the other hand, when the detection signal is sent from the first sensor 7 that is the photoelectric sensor, and the temperature detected by the second sensor 8 that is the temperature sensor is a temperature other than the body temperature of the person, it can be determined that the object enters into the delivery area DA.

Although, in the above embodiment, the sensor 9 is comprised of the first sensor 7 and the second sensor 8, the sensor 9 may be a single temperature sensor, for example. In this case, when the temperature detected by the sensor 9 is the body temperature of the person, the PLC 3 can determines that the operator enters into the delivery area DA. In this case, it is possible to set at least the first restricted area RA1.

In the above embodiment, although the cover 46 is provided to the table part 4, the cover 46 does not need to be provided. In this case, the first sensor 7 and the second sensor 8 can be fixed to the delivery part 45 so as to be oriented upwardly.

In the above embodiment, although the robot is comprised of the left arm 51L and the right arm 51R of the two-arm robot 5, it may be a robot having a single arm, for example. The configuration, the number, the material and the like of each element of the present disclosure are not limited to the configuration, the number, the material and the like of the above embodiment, but they may be altered suitably.

In the foregoing specification and specific embodiments of the present invention have been described. However, one of ordinary skill in the art appreciates that various modifications and changes can be made without departing from the scope of the present invention as set forth in the claims below. Accordingly and the specification and figures are to be regarded in an illustrative rather than a restrictive sense, and all such modifications are intended to be included within the scope of present invention. The benefits and advantages, solutions to problems, and any element(s) that may cause any benefit, advantage and or solution to occur or become more pronounced are not to be construed as a critical, required and or essential features or elements of any or all the claims. The invention is defined solely by the appended claims including any amendments made during the pendency of this application and all equivalents of those claims as issued.

What is claimed is:

1. A robot system, comprising:
   a robot;
   a controller for controlling an operation of the robot; and
   a sensor for detecting a person entering into a delivery area where the robot and the person deliver an object therebetween,
   wherein, when the sensor detects the person entering into the delivery area, the controller sets to the delivery area a first restricted area where the operation of the robot is restricted, and controls the robot based on the first restricted area,
   wherein the sensor is configured to be distinguishable of entering of the person into the delivery area from entering of the object into the delivery area, and
   wherein, when the sensor detects the object entering into the delivery area, the controller sets to the delivery area a second restricted area where the operation of the robot is restricted, and controls the robot based on the second restricted area.

2. The robot system of claim 1, wherein the controller carries out in the first restricted area at least one of prohibition of entering of the robot, restriction of a speed of the robot, restriction of a force of the robot, and restriction of one or more types of a tool that can be held by the robot.

3. The robot system of claim 1, wherein the second restricted area is smaller than the first restricted area.

4. The robot system of claim 1, wherein the controller carries out in the first and the second restricted areas at least one of prohibition of entering of the robot, restriction of a speed of the robot, restriction of a force of the robot, and restriction of one or more types of a tool that can be held by the robot, and
   wherein the controller sets the second restricted area so that the restriction of the operation of the robot is less than that of the first restricted area.

5. The robot system of claim 1, the sensor includes a first sensor for detecting the person and the object entering into the delivery area, and a second sensor for detecting entering of the person into the delivery area.

6. The robot system of claim 1, further comprising a table part for supporting the robot, wherein the robot system is constituted as a robot cell.

* * * * *